W. V. TURNER.
BLOW-OUT DEVICE FOR ELECTRIC PUMP GOVERNORS.
APPLICATION FILED JAN. 24, 1910.
1,141,158.
Patented June 1, 1915.
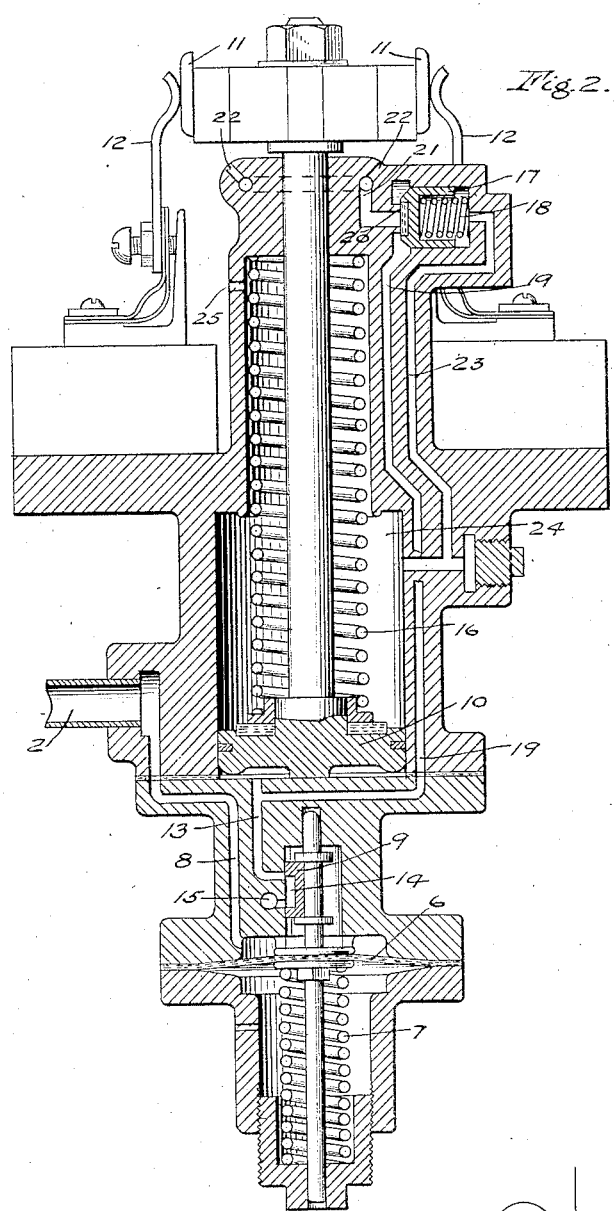
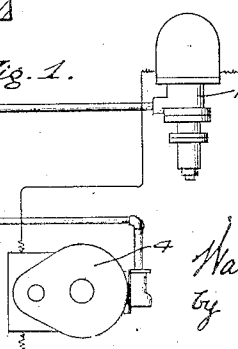

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

BLOW-OUT DEVICE FOR ELECTRIC-PUMP GOVERNORS.

1,141,158.  Specification of Letters Patent.  Patented June 1, 1915.

Continuation in part of application Serial No. 463,605, filed November 20, 1908. This application filed January 24, 1910. Serial No. 539,664.

*To all whom it may concern:*

Be it known that I, WALTER V. TURNER, a citizen of the United States, residing at Edgewood, in the county of Allegheny and State of Pennsylvania, have invented new and useful Improvements in Blow-Out Devices for Electric - Pump Governors, of which the following is a specification.

This invention relates to pressure governors for pumps, and more particularly to a blow out device for the switch of an electric pump governor.

The principal object of my invention is to provide an improved blow out device adapted to be automatically controlled by means of fluid under pressure.

The present application is a continuation in part of application Serial No. 463,605, filed November 20, 1908 which has matured as Patent No. 1,071,829.

In the accompanying drawing, Figure 1 is a diagrammatic view illustrating an electric pump equipment including a pump governor constructed according to my improvement and Fig. 2 a vertical section of an electric pump governor with my invention applied thereto.

In Fig. 1 of the drawings an electric pump governor 1 is shown connected up by a pipe 2 to the storage reservoir 3 into which an electric pump 4 compresses air through a supply pipe 5.

My invention may be applied to various types of electric pump governors and consequently the governor portion shown in Fig. 2 is merely illustrative of a simple form of governor comprising a movable abutment 6 subject on one side to the pressure of an adjustable spring 7 and on the opposite side to the pump pressure supplied from the reservoir pipe 2 through passage 8. The abutment 6 operates a valve 9 for controlling the admission and release of fluid under pressure to and from a switch actuating piston 10. Movable switch contacts 11 are carried by the piston 10 and are adapted to connect with fixed contact points 12 for controlling the pump motor circuit. A passage 13 leads from the valve seat of the valve 9 to the outer face of piston 10, and in operation when the pump pressure is less than the pressure of spring 7 the abutment 6 shifts the valve 9 so as to connect passage 13 through a cavity 14 with an exhaust port 15, and the piston 10 being subject to atmospheric pressure, the spring 16 maintains the parts with the electric switch closed. Upon the pump pressure increasing to a predetermined degree according to the adjustment of the spring 7, the valve 9 is shifted and fluid under pressure is admitted through the passage 13 to piston 10. The piston 10 is thereupon actuated and the switch is opened, stopping the pump.

According to my improvement, a blow-out device is provided comprising a piston valve 17 subject on one side to the pressure of a coil spring 18 and having a passage 19 leading from the space at the opposite side to the passage 13 opening to the piston 10. The spring 18 tends to normally maintain the piston valve 17 against a seat 20 which controls communication from passage 19 to a passage 21 having outlet ports 22 from which air is directed onto the switch points to blow out or prevent the formation of arcs. A passage 23 leads from the space at the spring side of the valve piston 17 to the upper portion of the piston chamber 24.

When the switch is cut in and the piston 10 is at its inner position, the passage 23 is open to the space above piston 10, which is at atmospheric pressure, being open in the usual manner through a port 25 to the atmosphere. The spring side of the valve piston 17 is consequently subject at this time to atmospheric pressure, and the passage 19 to the opposite face of the valve piston 17 being connected to passage 13, this side of the valve piston is also subject to atmospheric pressure, so that the spring 18 maintains the valve piston 17 in its closed position.

Upon movement of the valve 14 to admit fluid under pressure to the piston 10, air is also supplied to the passage 19 and acting on the exposed area of the seat side of the valve piston 17 operates to shift said valve piston to open communication through the passage 21, so that air issues from the ports 22 onto the switch points, to blow out or prevent the formation of arcs. In the outward movement of the piston 10, the port opening of passage 23 is passed over, so that fluid under pressure is thereupon admitted from the under side of piston 10 to said passage 23, and the fluid pressure on opposite sides of the valve piston 17 being thus substantially balanced, the spring 18 returns the valve piston to its seat 20 and cuts off further flow of air through the blow out ports 22. It will thus be seen that while fluid under pressure is supplied to the switch points in the act of separating, the flow of air is stopped upon the full outward movement of the piston 10 and waste of air is thereby prevented during the time the pump is cut out. Upon movement of the piston 10 to cut in the pump, the passage 23 is again opened to the atmospheric pressure above piston 10 and as both sides of the piston valve 17 are now at atmospheric pressure, the spring 18 maintains said valve piston in its closed position.

Having now described my invention, what I claim as new and desire to secure by Letters Patent, is:—

1. The combination with a pressure governor for pumps comprising an electric switch, an actuating piston therefor, and means for controlling the fluid pressure on said piston, of a blow-out valve device for controlling the supply of fluid to said switch, a spring acting on one side of said valve device and tending to hold the same closed, means for supplying fluid to the opposite side of said valve device upon movement of the switch from the closed position to open said valve device, and means for supplying fluid to the spring side of said valve device in the cut out position of the switch to close said valve device.

2. The combination with a pressure governor for pumps comprising an electric switch device, an actuating piston therefor, and means for controlling the fluid pressure on said actuating piston, of a blow-out valve device for controlling communication for supplying air to said switch device, a spring tending to maintain said communication closed, means for supplying fluid to the opposite side of said valve device in the act of separating the switch contacts to open communication for supplying fluid to said switch device, said switch piston being adapted in its outward movement to supply air to the spring side of said blow-out valve device to thereby permit the spring to actuate said valve device and close said blow-out communication.

3. The combination with a pressure governor for pumps comprising an electric switch device, an actuating piston therefor, and means for controlling the fluid pressure on said actuating piston, of a blow-out valve device operated by the flow of air to the actuating piston for supplying air to said switch device, means controlled by the movement of said actuating piston to its cut out position for supplying fluid to the opposite side of said blow out valve device, and a spring for operating said valve device to cut off the supply of air to said switch device.

4. The combination with a pressure governor for pumps comprising an electric switch, an actuating piston therefor, and means for controlling the fluid pressure on said actuating piston, of a blow-out valve device for controlling the supply of fluid to said switch, a spring acting on one side of said valve device and tending to hold the same closed, means for admitting fluid which actuates the switch piston to the opposite side of said valve device, to thereby effect the opening of said valve device, and means operating upon movement of the switch piston to the cut-out position for admitting fluid to the spring side of said valve device to equalize the fluid pressures on opposite sides thereof and thereby permit the spring to close the same.

In testimony whereof I have hereunto set my hand.

WALTER V. TURNER.

Witnesses:
Wm. M. Cady,
A. M. Clements.